United States Patent Office 3,153,777
Patented Oct. 20, 1964

3,153,777
SUPERCONDUCTIVE ELEMENT
Zeniti Kiyasu and Hideo Shimura, Tokyo, Japan, assignors to Nippon Telegraph and Telephone Public Corporation, Tokyo, Japan, a corporation of Japan
Filed Nov. 21, 1960, Ser. No. 70,829
Claims priority, application Japan, Nov. 24, 1959, 34/36,418; Dec. 16, 1959, 34/39,074
14 Claims. (Cl. 340—173.1)

This invention relates to a superconductive element.

It is known that, when a filament or film of a superconductive conductor such as, for example, tin, lead, tantalum or niobium is cooled to a temperature below the transition temperature inherent to said conductor, there will be presented a superconductive state wherein the resistance is perfectly zero. However, if the magnitude of an electric current passed through said filament or film is increased until the fixed value determined by that temperature is exceeded, a resistance will be produced and the normal conductive state will set in. The present invention is to form a switching circuit element by electromagnetically controlling the reversible transition between such superconductive state and normal conductive state.

It is also known that, when a persistent current is generated in a circulating path made of a superconductive conductor, as the resistance of the circulating path is perfectly zero, said persistent current will keep on flowing permanently. The present invention is to form a memory element performing a memory action by utilizing such permanent current.

The present invention relates to a superconductive element wherein a superconductive conductor formed to have at least one electrically symmetrical axis is provided with one pair of signal terminals and one pair of exciting terminals arranged so as to be on the symmetrical axis and four electric branches are formed in the form of bridges by said terminals so that the transition between the superconductive state and normal conductive state within said superconductive conductor may be controlled by the exciting current and input signal current.

The present invention further relates to a superconductive circuit element wherein said superconductive conductor is provided with one pair of signal terminals and one pair of exciting terminals arranged so as to be on symmetrical axes intersecting at right angles with each other so that the transition between the superconductive state and normal conductive state of said superconductive conductor may be controlled by said exciting current.

The present invention still further relates to a superconductive memory element wherein said superconductive conductor is provided with one pair of exciting terminals arranged so as to be on a symmetrical axis and one pair of write-in or read-out terminals arranged so as to be on a non-symmetrical axis so that the continuous generation of a persistent current may be controlled by transiting said superconductive conductor between the superconductive state and normal conductive state and proper electric signals may be obtained by utilizing said persistent current.

An object of the present invention is to provide a circuit element that can simply form basic circuits for logical operations or circuits for storing, NOT, OR and AND operations.

Another object of the present invention is to provide a circuit element which is very small, is easy to make, is stable in the action and is very high in the acting velocity.

A further object of the present invention is to obtain a circuit element that can be used for electronic calculating machines, electronic switchboards and controllers which are very low in electric power consumption.

Another further object of the present invention is to provide a memory element that can well perform a memory action with a very small write-in current or read-out current flowed between terminals having non-symmetrical axes by properly selecting a current flowed between terminals having symmetrical axes.

A still further object of the present invention is to provide a memory element in which, as a persistent current may be merely kept flowing during an information memorizing period, the information can be memorized permanently and in which the electric power consumption is low and write-in or read-out operations can be made at a high speed and with slight signals.

In the accompanying drawings.

Figure 1:
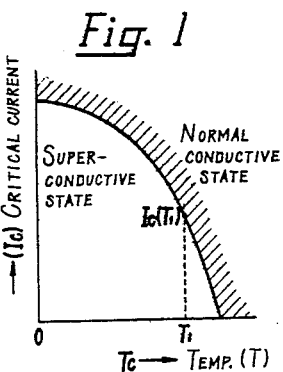
FIGURES 1 and 2 are explanatory views of a superconductive phenomenon to explain the action of the element of the present invention.
Figure 2:
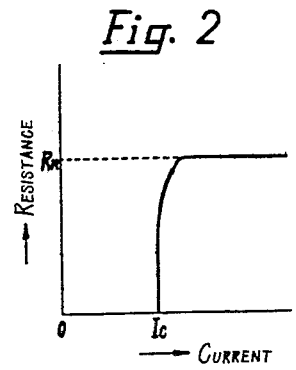

It has already been described that, when a filament or film of a superconductive conductor (such as, for example, tin, lead, tantalum or niobium) is cooled to a temperature $T_1$ below the transition temperature $Tc$ inherent to said conductor, there will be presented a superconductive state wherein the resistance is perfectly zero. However, if the magnitude of an electric current passed through said filament or film is increased until the fixed value $Ic(T_1)$ determined by that temperature is exceeded, a resistance will be produced and the normal conductive state will set in. Between the critical current $Ic$ and the temperature $T$ in such case will generally exist such relation as is shown in FIGURE 1. Further, the relation between the passed current and the resistance value at a fixed temperature will have such characteristics are are shown in FIGURE 2.

Figure 3:
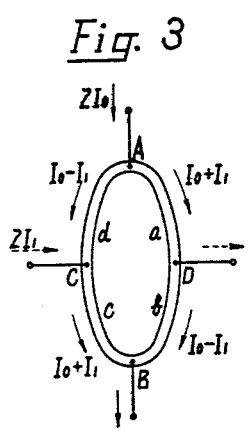
FIGURE 3 is a view showing an embodiment of the circuit element of the present invention.
Figure 4:
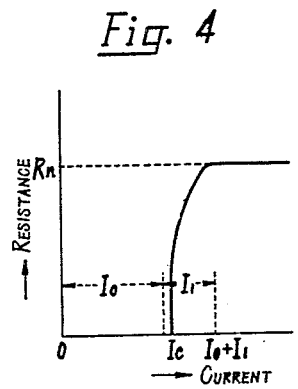
FIGURE 4 is a diagram for explaining the action of the element of the present invention.

Utilizing the reversible transition between such superconductive state and the normal conductive state is the principle of the action of the circuit element according to the present invention. With reference to FIGURE 3, a ring is formed of a superconductive conductor. This superconductive conductor is not limited to the formation of the ring but may be in the form of a rectangle or any other form having symmetrical axes intersecting at right angles. At four points, A, B, C and D arranged at regular intervals on the periphery of said ring are provided lead wires for feeding electric currents. Now, if the sections A–D, B–D, B–C and C–A are represented by $a$, $b$, $c$ and $d$, respectively, and when a current $2I_0$ is flowed from the terminals A to B and a current $2I_1$ is flowed from the terminals C to D, a current $I_0+I_1$ will flow through the sections $a$ and $c$ and a current $I_0-I_1$ will flow through the sections $b$ and $d$. Now, it shall be assumed that the critical current of the ring shaped superconductive conductor is represented by $I_C$ and the currents $I_0$ and $I_1$ are set as shown in FIGURE 4, that is, the current values are so selected that $I_0$ may be slightly smaller than $I_c$ and $I_0+I$ may be well normally conductive.

If only the current $2I_0$ is flowed between the terminals A and B at first, it will flow as equally divided to the branches ACB and ADB, therefore the current $I_0$ will flow through each of the sections $a$, $b$, $c$ and $d$ and each section will be kept in a superconductive state. However, when the current $2I_1$ is flowed between the terminals C and D, the current flowing through each section will be as shown in FIGURE 3, therefore the sections $a$ and $c$ will transit to the normal conductive state but the sections $b$ and $d$ will remain kept in the superconductive state. It is needless to say that, when either of the currents is removed from such state, each section will return to the superconductive state. Further, it can be easily understood that, if either one of the directions of the currents shown in FIGURE 3 is reversed, the sections $b$ and $d$ will transit to the normal conductive state and that, if both are reversed, the sections $a$ and $c$ will transit again to the normal conductive state. In such case, the transition characteristics shown in FIGURE 4 are so steep that the curernt $I_1$ can be made smaller and therefore the switching between the superconductive state and normal conductive state can be controlled by flowing a very slight current pulse $2I_1$ between the terminals C and D.

If the electromotive force generated between the terminals A and D in FIGURE 3 is to be utilized as an output, it will show a resistance value $R_n$ in the normal conductive state and therefore the output voltage will be as follows:

$$\text{Output voltage} = (I_0+I_1)R_n \doteqdot I_cR_n \doteqdot I_oR_n$$

If the element in the next stage is to be controlled by this output voltage, as the next stage is in a superconductive state, the load resistance may be considered to be zero and therefore the output current will be as follows:

$$\text{Output current} = \frac{\text{Output voltage}}{\frac{R_n}{2}} \doteqdot 2I_0$$

On the other hand, as the necessary input current is $2I_1$, the current gain will be approximately as follows:

$$\text{Current gain } G \doteqdot \frac{2I_0}{2I_1} = \frac{I_0}{I_1}$$

However, as described above, $I_0 \gg I_1$, therefore a very large current gain can be obtained.

As explained above, the element according to the present invention has a current gain, can therefore form various conventional switching circuits such as, for example, flip-flop circuits and binary counter circuit, can be operated specifically by such majority logical operation type as is described below and is thus very favorable.

Figure 5:
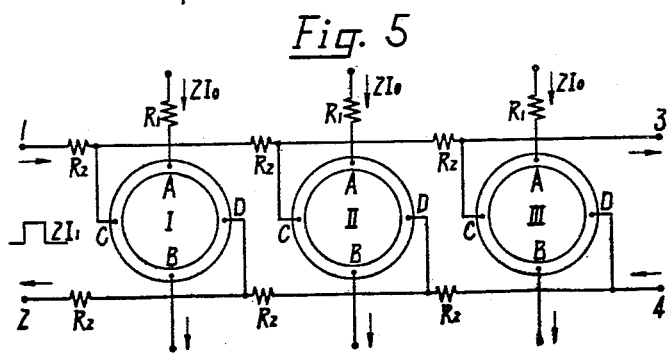
FIGURES 5 and 6 are basic formation views of a logical operation circuit formed of the element of the present invention.

FIGURE 5 shows an embodiment of the logical operation circuit in which is used the element of the present invention. If a trigger current $2I_1$ is flowed from the input terminal 1 on the left side of the terminal 2, first the element I will be switched to a normal conductive state by such action as is explained above. In such case, the input added from the left side will be prevented by the resistance $R_2$ from acting on the element II and others following it. In the element I, voltages will be generated between the terminals A and D and between the terminals C and B but will appear as an output between the terminals C and D, because, between the terminals A and C and between the terminals B and D, the state is superconductive and the resistance is zero. This output will become a trigger current passing through the element II and the resistances $R_2$ and will operate the element II.

Figure 7:
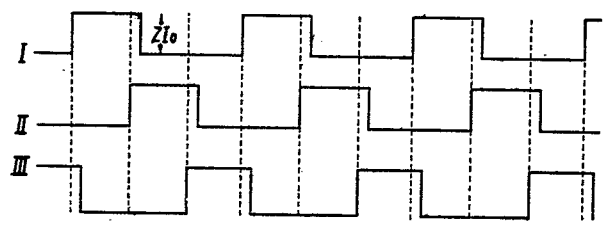
FIGURE 7 is a wave form view of an exciting current required for the circuits shown in FIGURES 5 and 6.

In such case, it is desirable to select the resistance $R_2$ so as to be large in the range in which the current gain is allowed. Thereby the reaction to the element I can be suppressed. As in the above, the state can be moved rightward to the elements I, II, III . . . in turn. Especially, if a three-phase excitation current pulse having such wave form as is shown in FIGURE 7 is used for the current $2I_0$, the phase I is added to the elements I, IV, VII . . . , the phase II is added to the elements II, V, VIII . . . and the phase III is added to the elements III, VI, IX . . . , the transmission of signals in one direction can be very favorably carried out.

Figure 6:
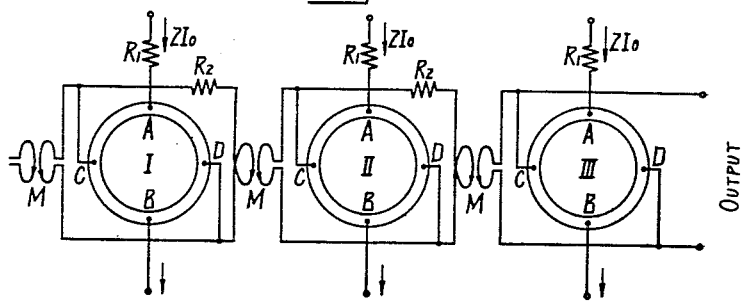

In some cases, it may be more convenient to use them by electromagnetically coupling the stages with each other as shown in FIGURE 6. The coupling in such case can be made very simply and yet substantially perfectly by making rings each of which is of one coil and is made of a superconductive conductor approach each other.

Figure 8A:
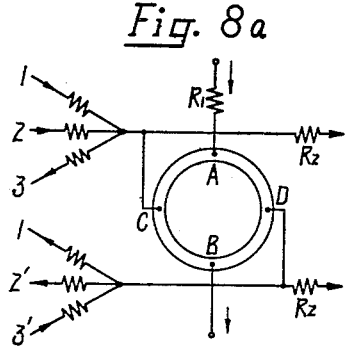
FIGURES 8a and 8b are views showing embodiments of a multi-input circuit.
Figure 8B:
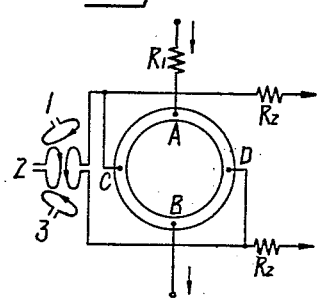
Figure 9A:
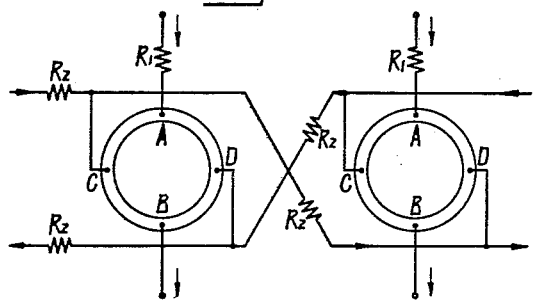
FIGURES 9a and 9b are views showing NOT circuits.
Figure 9B:
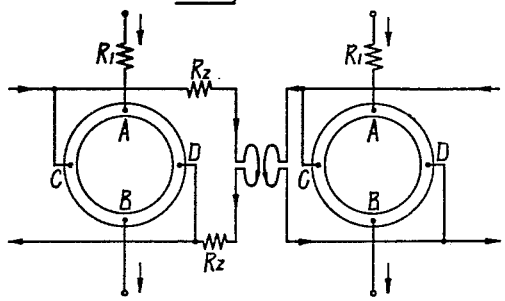
Figure 10:
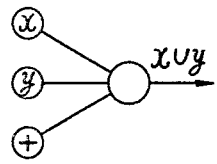
FIGURE 10 is a view showing an OR circuit.
Figure 11:
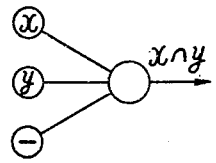
FIGURE 11 is a view showing an AND circuit.
Figure 12:
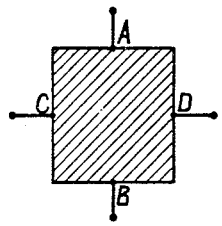
FIGURES 12, 13, 14, 15, 16 and 17 are views showing the other embodiments of the element according to the present invention.
Figure 13:
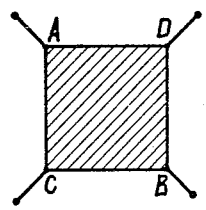
Figure 14:
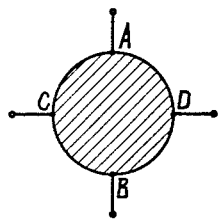
Figure 15:
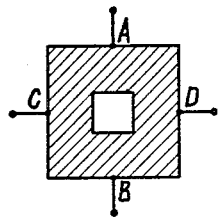
Figure 16:
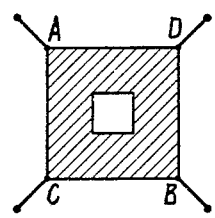

If a multi-input signal is used for the input signal of the circuit elements according to the present invention, the action will be determined by majority. The circuits in such case are shown in FIGURES 8a and 8b. A NOT circuit can be very simply formed by merely making the inter-stage connections intersect each other as shown in FIGURES 9a and 9b. An OR circuit or an AND circuit can be formed by the majority logical operation type by adding a normal output element as shown in FIGURE 10 or 11, respectively.

The element of the present invention as in the form of a ring has been explained. However, it may be in the form of a square, rectangle, circle, hollow square or the like but must always have symmetrical axes intersecting at right angles with each other.

Figure 17:
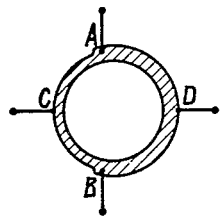

Further, if the existence of electrically symmetrical axes is converted to the existence of geometrically symmetrical axes by making the branch ACB of the superconductive conductor thin and short and forming the branch ADB to be thick and long as shown in FIGURE 17, even if the input and output terminal and the exciting terminal do not always have symmetrical axes intersecting at right angles, the same action as has already been described will be able to be attained.

A memory element is obtained by modifying the circuit element of the present invention. Once a persistent current is caused by any cause in a circulating path made of a superconductive conductor, as the resistance of the circulating path is perfectly zero, such persistent current will keep on flowing permanently. Therefore, by utilizing such persistent current, a memory action is carried out. In the already described circuit element, the input terminal or the output terminal and the exciting terminal are so arranged as to have normally intersecting symmetrical axes. But, in the memory element, the write-in or read-out terminal (which will be a write-in terminal in the case of write-in but will be a read-out terminal in the case of read-out) is arranged on a non-symmetrical axis but the exciting terminal must be arranged on a symmetrical axis.

Figure 18:
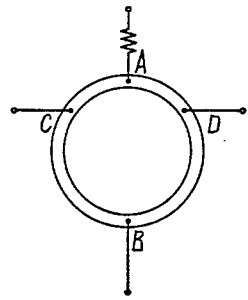
FIGURE 18 is a view showing an embodiment in the case of using the element of the present invention as a memory element.
Figure 19:
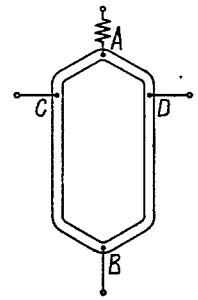
FIGURE 19 is a view showing another embodiment of the memory element shown in FIGURE 18.

An embodiment of the memory element of the present invention shown in FIGURE 18 shall be explained. Current feeding lead wires are provided at two points A and B on the periphery of a ring made of a filament or film of a superconductive conductor so that the ring may be equally divided into two at the terminals A and B. The form of the superconductive conductor need not be limited to a ring but may be any forming a circulating path having symmetrical axes. It is necessary that the current terminals should be added to the two intersections of the symmetrical axes with the circulating path. Another embodiment is as shown in FIGURE 19. Current terminals C and D are required in addition to the current terminals A and B. It is necessary that said terminals C and D should not be on the symmetrical axes.

It is as already explained with reference to FIGURE 2 that, when a current is flowed through the circulating path, if the current is below a fixed critical current $I_c$ determined by the temperature of the element and the cross-sectional area of the circulating path, the path will be in a superconductive state but, when the critical current is exceeded, a resistance will be produced and the circulating path will be in the normal conductive state.

Now, if a current $2I_0$ is flowed from the terminal A to B, it will flow as equally divided into two through the branches ACB and ADB. Therefore, a current $I_0$ will flow through each branch. If the current $I_0$ is kept below the critical current $I_c$, each branch will be in a superconductive state. Next, if a current I is flowed from the terminal C to the terminal D, a current $I_1$ will flow through the branch CAD and a current $I_2$ will flow through the branch CBD as divided. That is to say, $I=I_1+I_2$. However, the rates of its division are inversely proportional to the inductances of the respective branches. That is to say, if $L_1$=the inductance of the branch CAD and
$L_2$=the inductance of the branch CBD then the currents $I_1$ and $I_2$ will be as follows:

$$I_1 = \frac{IL_2}{L_1+L_2} \text{ and } I_2 = \frac{IL_1}{L_1+L_2}$$

Figure 20:
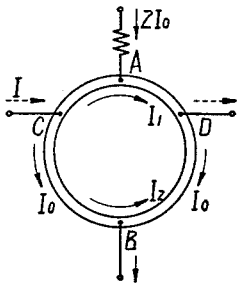
FIGURES 20 to 24 are views for explaining the action of the memory element according to the present invention.

If $L_1<L_2$ for the brevity of the following explanation, $I_1>I_2$. If the directions of the currents shown in FIGURE 20 are taken into consideration, The current flowing through $$\text{the section } A\text{-}D = I_0 + I_1$$

The current flowing through $$\text{the section } A\text{-}C = I_0 - I_1$$

The current flowing through $$\text{the section } C\text{-}B = I_0 + I_2 \text{ and}$$

The current flowing through $$\text{the section } D\text{-}B = I_0 - I_2$$

Therefore, in such case, the current $I_0+I_1$ is the largest.

Now, if the current I is increased, the current $I_0+I_1$ will first reach the critical current $I_c$ and therefore the section A–D will first come to transit to the normal conductive state. However, as all the other three sections are in the superconductive state, if the current I is increased above that, all the increased part will flow through the branch CBD and only the current $I_2$ will be increased. If the current is further increased, the current $I_0+I_2$ will at last reach the critical current $I_c$ and the section C–B will also come to transit to the normal conductive state. However, now let us consider the intermediate state wherein only the section A–D has reached the normal conductive state but the section C–B has not yet reached it.

In such case, the relations that $$I_0+I_1=I_c$$

and $$I_2=I-I_1$$

will be established. Therefore, $$I_1=I_c-I_0$$

and $$I_2=I-I_c+I_0$$

Figure 21:
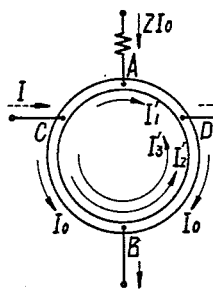

However, as shown in FIGURE 21, such state is equivalent to the flowing in the illustrated directions of the following currents $$I_1' = \frac{IL_2}{L_1+L_2}$$

$$I_2' = \frac{IL_1}{L_1+L_2}$$

$$I_3' = I_0 + \frac{IL_2}{L_1+L_2} - I_c$$

because $$I_1 = I_1' - I_3' = I_c - I_0$$
$$I_2 = I_2' + I_3' = I_c + I_0$$

Figure 22:
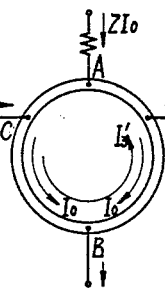
Figure 23:
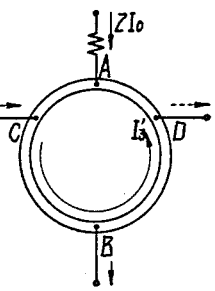

Then, if the current I is removed from such state, the current $$I_1' = \frac{IL_2}{L_1+L_2}$$

will vanish from the branch CAD, the current $$I_2' = \frac{IL_1}{L_1+L_2}$$

will vanish from the branch CBD, the persistent current $I_3'$ will remain and such state as is shown in FIGURE 22 will set in. In such case, each branch will return to the superconductive state and therefore the persistent current $I_3'$ will keep on flowing without decreasing. Further, if the current $2I_0$ kept flowing from the terminal A to the terminal B is removed, only the persistent current $I_3'$ will keep on flowing as shown in FIGURE 23.

It is evident that, if the direction of the current added between the terminals C and D is reversed and the current is flowed from the terminal D to the terminal C, the direction of the current $I_3'$ will be also reversed. Therefore, in the element of the present invention, it is possible to produce a persistent current in the superconductive circulating path by flowing an input signal current between the terminals C and D while flowing a proper bias current between the terminals A and B. Further, the direction of the persistent current will be also determined by the polarity of the signal to be added. Therefore, the element of the present invention can be utilized as a memory element. In such case, as the current $2I_0$ has been kept flowing from the terminal A to the terminal B, if the current $I_0$ is selected to be somewhat lower than the critical current $I_c$, the object will be able to be attained by a slight current pulse for the signal current I.

The principle of the action of carrying out the write-in operation in the memory element according to the present invention has been explained in the above. Next, the principle of the action of reading out the written-in signal shall be explained. If the write-in has been already made in the above mentioned memory element, there will exist only two states that the persistent current is flowing clockwise as described above and that it is flowing anti-clockwise. For the sake of convenience of explanation, let us consider the case that the persistent current $I_3'$ is flowing anticlockwise as shown in FIGURE 23. In such case, if a current $2I_0$ is flowed from the terminal A to the terminal B, it will be divided into $I_0$ for each of the branches ACB and ADB and such state of current division just as in FIGURE 22 will be produced. Therefore, a current $I_0+I_3'$ will flow through the branch ACB and a current $I_0-I_3'$ will flow through the branch ADB. In such case, as either section is kept in a superconductive state, $I_0+I_3'<I_c$.

But $$I_3' = I_0 + \frac{IL_2}{L_1+L_2} - I_c$$

Therefore, it is necessary that the write-in current I should be so selected that the condition of $$\frac{IL_2}{L_1+L_2} < 2(I_c-I_0)$$

may be satisfied.

Figure 24:
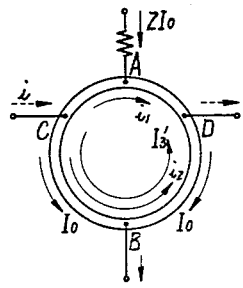

In such state, if a read-out current $i$ flows from the terminal C to the terminal D, a current $$i_1 = \frac{iL_2}{L_1+L_2}$$

will flow through the branch CAD, a current $$i_2 = \frac{iL_1}{L_1+L_2}$$

will flow through the branch CBD and such current division as is shown in FIGURE 24 will be likely to occur. Therefore, in such case, the current $I_0+I_3'+i_2$ flowing through section C–B will be the largest and will first reach the critical current $I_c$. Once the current flowing through the section C–B reaches the critical current $I_c$, the current will not be able to increase to be more than that. Therefore, if the read-out current flowing into the terminal C is such current as will increase at a fixed rate, the moment the current $I_0+I_3'+i_2$ reaches the critical current $I_c$, the current flowing through the branch CBD will stop increasing and will remain a fixed current. At the same time, the rate of increase of the current flowing through the branch CAD will become high at that moment. However, as an inductance is present in either of the sections, with such variation of the rate of increase of the current, such differential pulse as is shown in FIGURE 25a will be generated between the terminals A and B.

Figures 25A, 25B:
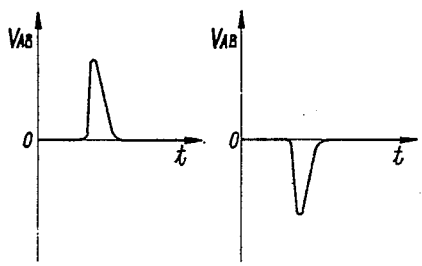
FIGURES 25a and 25b are views showing output wave forms of the memory element of the present invention.

If the directions of the currents added from the terminals A and C are left as mentioned above and only the direction of the persistent current $I_3'$ that existed at first is reversed to be anticlockwise, the voltage pulse generated between the terminals A and B by the same action will be as shown in FIGURE 25b and will be of a polarity reverse to that shown in FIGURE 25a. Therefore, the state written-in in advance by this method, that is, the direction of the persistent current can be read-out.

In the memory current according to the present invention, if the current $2I_0$ flowed between the terminals A and B on the symmetrical axes is properly selected, even when the write-in current I and the read-out current $i$ flowed between the terminals C and D on the non-symmetrical axes are made small enough, the memory action will be able to be made.

Figure 26:
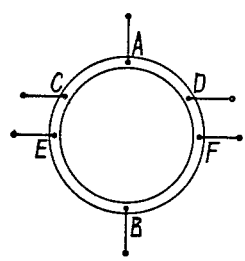
FIGURE 26 is a view showing another embodiment of the element of the present invention.

In the above described element, the read-out output was taken out from between the terminals A and B. However, if so required, as shown in FIGURE 26, the read-out terminals E and F may be added separately.

Figure 27:
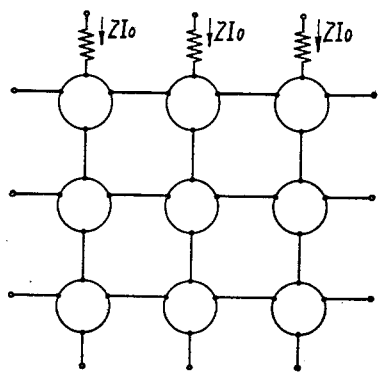
FIGURE 27 is a view showing an applied example in which the elements of the present invention are arranged in the form of a matrix.

Further, needless to say, even when the memory element according to the present invention is used alone, it will be effective. In case many of such elements are to be used, it will be convenient to arrange them in the form of a matrix as shown in FIGURE 27 in the same plane.

The superconductive conductor used for the memory element according to the present invention may be in the form of a ring, square, rectangle, circle or modified diamond in which the vertical diagonal is not equally divided by the horizontal diagonal.

Figure 28:
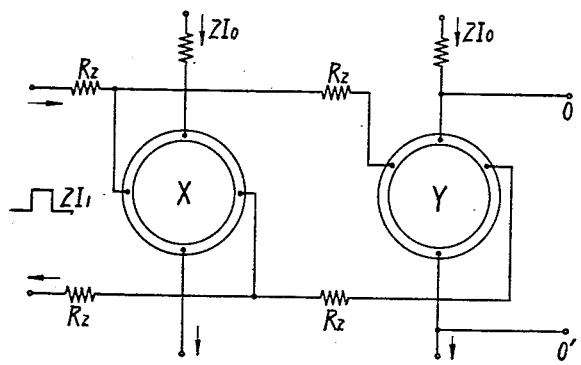
FIGURE 28 is a circuit diagram showing an embodiment wherein the circuit element of the present invention is combined with a memory element.

The superconductive circuit element and superconductive memory element according to the present invention can be used as properly combined. Especially, if a three-phase excitation current pulse is used for the bias current $2I_0$, it will be very effective. FIGURE 28 shows an embodiment of the combination. When the circuit element X and the memory element Y are combined with each other and an input signal pulse $2I_1$ is added to the element X, the output appearing as amplified will be added to the element Y and the write-in action of memory will be carried out. Further, in case a memory persistent current is already present in the element Y, a voltage pulse will be generated between the output terminals O and O′ by the same action and the read-out can be made.

What is claimed is:

1. A superconductive logic element comprising a superconductive conductor formed of a single closed loop of conductive material having at least two electrically symmetrical axes consisting of superconductive material having a single temperature at which a reversible transition between superconductive and normal conductive states takes place, signal means including one pair of signal terminals for supplying an input signal and exciting means including one pair of exciting terminals for supplying an exciting current, said signal means and said exciting means being connected to said conductor by direct conductive connections located at said symmetrical axes of said conductor wherein four electric branches are formed in the form of a bridge by said terminals, wherein the transition between the superconductive state and normal conductive state within said superconductive conductor is controlled solely by the exciting current and input signal current flowing in said conductor.

2. A superconductive logic element according to claim 1, wherein said pair of exciting terminals and said pair of signal terminals are connected to said conductor on symmetrical axes intersecting at right angles with each other, whereby the transition between the superconductive state and normal conductive state within said conductor may be controlled by said signal current.

3. A superconductive logic element according to claim 2, wherein the superconductive conductor is in the form of a ring.

4. A superconductive logic element according to claim 2, wherein the superconductive conductor is in the form of a square.

5. A superconductive logic element according to claim 2, wherein the superconductive conductor is in the form of a rectangle.

6. A superconductive logic element according to claim 2, wherein the superconductive conductor is in the form of a hollow square.

7. A superconductive memory element comprising a superconductive conductor comprising a single closed loop of conductive material arranged to have two symmetrical axes intersecting at right angles, and consisting of superconductive material having a single temperature at which a reversible transition between superconductive and normal conductive states takes place, one pair of exciting terminals connected to said conductor on a symmetrical axis of said superconductive conductor to produce a current path within the conductor and a second pair of terminals connected to said conductor on a non-symmetrical axis of said superconductive conductor to produce a further current path within the conductor, wherein the continuous generation of a persistent current is controlled by translating said conductor between the superconductive state and normal conductive state and electric signals are obtained by utilizing the persistent current, and input and output control signals consist of conductive current paths to said conductor.

8. A superconductive memory element according to claim 7, further including a third pair of terminals.

9. A superconductive memory element according to claim 7 wherein the superconductive conductor is in the form of a ring.

10. A superconductive memory element according to claim 7, wherein the superconductive conductor is in the form of a square.

11. A superconductive memory element according to claim 7, wherein the superconductive conductor is in the form of a rectangle.

12. A superconductive memory element according to claim 7, wherein the superconductive conductor is in the form of a circle.

13. A superconductive memory element according to claim 7, wherein the superconductive conductor is substantially in the form of a diamond.

14. An information memory circuit comprising a superconductive conductor of a single closed loop of conductive material shaped to have two symmetrical axes intersecting at right angles, and consisting of superconductive material having a single temperature at which a reversible transition between superconductive and normal conductive states takes place, input current means including a first pair of terminals and exciting current means including a second pair of terminals connected to said conductor, said input and exciting current means conducting current into said loop at points on respective axes intersecting at right angles with each other, said first pair of terminals being arranged so as to be on a symmetrical axis of said superconductive conductor and said second pair of terminals being arranged so as to be on a non-symmetrical axis of said superconductive conductor wherein the input and output current means constitute the sole electrical coupling to said conductor.

References Cited in the file of this patent

UNITED STATES PATENTS

| 2,666,884 | Ericsson et al. | Jan. 19, 1954 |
| 3,031,586 | Anderson | Apr. 24, 1962 |
| 3,043,512 | Buckingham | July 10, 1962 |

FOREIGN PATENTS

| 1,243,408 | France | Sept. 5, 1960 |

OTHER REFERENCES

Low Temperature Physics and Chem., Proc. 5th International Conference on Low Temperature Physics, University of Wisconsin Press (by Buckingham), 1958, pp. 229–241.